United States Patent

[11] 3,609,228

[72] Inventors Peter C. Goldmark; Robert A. Castrignano; John M. Hollywood; Donald W. Ridley, all of Fairfield County, Conn.
[21] Appl. No. 776,137
[22] Filed Nov. 15, 1968
[45] Patented Sept. 28, 1971
[73] Assignee Columbia Broadcasting System, Inc. New York, N.Y.

[54] VIDEO FILM AND FILM-RECORDING APPARATUS
19 Claims, 9 Drawing Figs.

[52] U.S. Cl. .......... 178/6.7, 178/5.4 CD
[51] Int. Cl. .......... H04n 5/86
[50] Field of Search .......... 178/5.2, 5.4 CR, 6.7, 6.7 A, 6.6 TP

[56] References Cited
UNITED STATES PATENTS
2,953,633 9/1960 Hughes .......... 178/5.2
3,236,943 2/1966 Moller .......... 178/6.7

*Primary Examiner*—James W. Moffitt
*Assistant Examiner*—J. Russell Goudeau
*Attorney*—Brumbaugh, Graves, Donohue & Raymond

ABSTRACT: Electronic system for producing a motion picture record containing two adjacent successions of picture frames separated by an intermediate strip containing synchronizing or reference information to be used by scanning apparatus during reproduciotn. The synchronizing information comprises a narrow window-type mark disposed in the intermediate strip in a precise predetermined location with respect to the frames, and reference information, which can also appear in a margin adjacent the frames, may comprise alternating relatively opaque and transparent portions. Additionally, the intermediate strip or margin of the record adjacent the frames of one of the successions contains a record of reference carrier waveform in the event that those frames carry a representation of color information in the form of modulation of a carrier.

The system includes means for generating a signal at a predetermined time following the initiation of each vertical scanning sequence of the video source and a second signal in predetermined time relation to the horizontal scanning rate of the video source. Upon time coincidence of the generated signals, an output signal is mixed with the video signal and fed to the modulating input of a recording beam used in making the record. This results in recorded synchronizing or reference indicia in the intermediate strip or margin of the record medium.

INVENTORS
PETER C. GOLDMARK,
ROBERT A. CASTRIGNANO,
JOHN M. HOLLYWOOD &
DONALD W. RIDLEY
BY Brumbaugh, Graves, Donohue & Raymond
ATTORNEYS INVENTORS
PETER C. GOLDMARK,
ROBERT A. CASTRIGNANO,
JOHN M. HOLLYWOOD &
BY DONALD W. RIDLEY
Brumbaugh, Graves, Donohue & Raymond
their ATTORNEYS INVENTORS
PETER C. GOLDMARK,
ROBERT A. CASTRIGNANO,
JOHN M. HOLLYWOOD &
DONALD W. RIDLEY
BY Brumbaugh, Graves, Donohue & Raymond
their ATTORNEYS INVENTORS
PETER C. GOLDMARK,
ROBERT A. CASTRIGNANO,
JOHN M. HOLLYWOOD &
DONALD W. RIDLEY
BY Brumbaugh, Graves, Donohue & Raymond
their ATTORNEYS INVENTORS
PETER C. GOLDMARK,
ROBERT A. CASTRIGNANO,
JOHN M. HOLLYWOOD &
DONALD W. RIDLEY
BY Brumbaugh, Graves, Donohue & Raymond
their ATTORNEYS

VIDEO FILM AND FILM-RECORDING APPARATUS

BACKGROUND OF THE INVENTION

This invention relates to the recording of video information on a record medium, and particularly to a system for recording reference and synchronizing indicia on the record medium in a predetermined location to be sensed by the apparatus used in reproducing the recorded video information.

In U.S. Pat. application Ser. No. 519,106 of Goldmark and Hollywood for "Color Film Recording and Reproducing Apparatus," assigned to the assignee of this invention, it is proposed to record color video information in a motion picture film format, with luminance information of a particular scene occupying one frame, or frame portion, and coded color information in the scene occupying a separate frame or frame portion. As disclosed there, the coded color information is a monochrome record of a carrier signal modulated in amplitude and phase in accordance with the saturation and hue of the color component in the original scene, together with a superimposed record of a reference carrier at a different frequency, both frequencies being multiples of the line recording rate. During reproduction, a frame containing the color information is scanned independently or simultaneously with the corresponding luminance frame to derive a color video output signal for application to a television receiver.

A record medium of the type described above can be scanned for reproduction, using the scanning technique disclosed in U.S. application Ser. No. 268,911 of Bernard Erde for "Film Scanning for Television Reproduction" now U.S. Pat. No. 3,410,954 in which each scene to be reproduced is repeated at least once on the record medium and the scanning raster has a dimension, in the scanning zone, equal to twice the pitch distance between adjacent frames of recorded information. The record medium is conveyed continuously through the scanning zone so that each frame moves a distance equal to the dimension of the raster in the scanning zone during each vertical scan. In such case, it is desirable to develop a synchronizing signal at a predetermined time during each such vertical scan to initiate the successive vertical scan, thereby maintaining synchronism between the rate of movement of the record medium frames to the scanning zone. Additionally, the synchronizing signal may be applied in a similar manner to synchronize operation of the receiver with the rate at which the record medium frames are scanned. The synchronizing signal is derived by sensing synchronizing indicia recorded at regularly spaced intervals on the film.

SUMMARY OF THE INVENTION

To the end of avoiding signal transients at the filter and in accordance with the invention, one or more cycles of the reference carrier is recorded on the record medium adjacent the frame carrying the color information so that, when this frame is scanned in the reproducing apparatus, the composite video signal is preceded by corresponding number of cycles of a signal at the reference carrier frequency, thereby "ringing" the filter prior to application of the video color signal. In this manner, all serious transients caused by the sudden application of the signal at the beginning of each scan line are allowed sufficient time to subside to a tolerable level before the active portion of the scan occurs.

When the record medium does not contain color information, but rather adjacent tracks of monochrome program material, the carrier signal may be omitted. It is still necessary, however, to provide suitable accurately located synchronizing indicia. Moreover, it is desirable to locate such indicia so that the reproducing apparatus is compatible with records containing either a single color program or two monochrome programs. In accordance with the present invention, such synchronizing indicia are located in a precisely predetermined location with respect to each frame, preferably in the strip intermediate the two successions of frames, so that a single detecting unit may be used for generating the synchronizing signal upon reproduction. In this way, no special optical systems are needed to adapt to the type of record, or film, being reproduced. As a result, the overall lateral dimension of the film may be reduced or utilized for other purposes, such as a magnetic sound track.

Where a color film of the type described is used for broadcast purposes, in which case a conventional television scanning system is used, the synchronizing marks may be eliminated and replaced with a record of a number of cycles of a chroma pilot signal. The frames adjacent film perforations may have associated with them, in place of synchronizing marks, relatively opaque and transparent portions providing a monochrome contrast reference for the video broadcasting equipment.

In the present invention, any of the foregoing formats of film may be obtained form a single system in which a signal related to the vertical scanning rate of the video source during recording is generated at a predetermined time in the vertical scanning sequence of the video source, and a second signal generated at predetermined times in the horizontal scanning sequence. In joint response to such generated signals, a reference signal output is provided and combined with the video signal for application to the modulating input of a beam recording camera, which may be an electron beam recording camera. This makes it possible to precisely locate synchronizing or reference indicia on the film in both the lateral and longitudinal directions.

BRIEF DESCRIPTION OF THE DRAWINGS

For a better understanding of these and other aspects of the invention, together with the further advantages thereof, reference may be made to the following detailed description, taken in conjunction with the drawings, in which.

DESCRIPTION OF THE PREFERRED EMBODIMENTS

Figure 1:
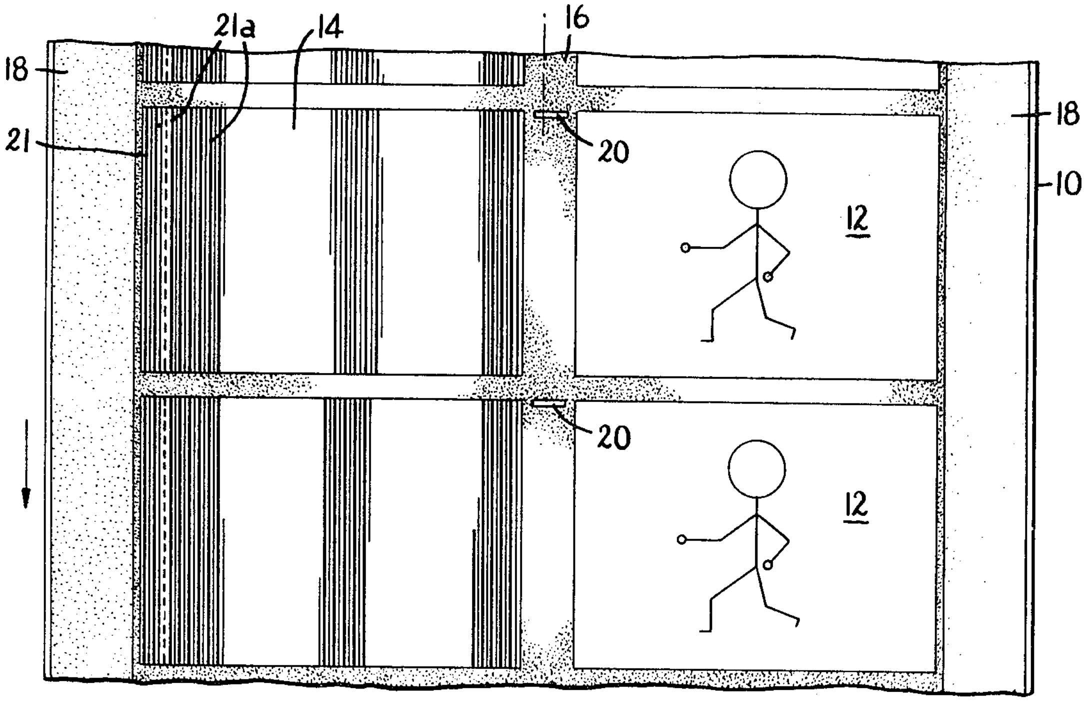
FIG. 1 is a plan view of a film record medium recorded with synchronizing indicia in accordance with the invention.
Figure 3:
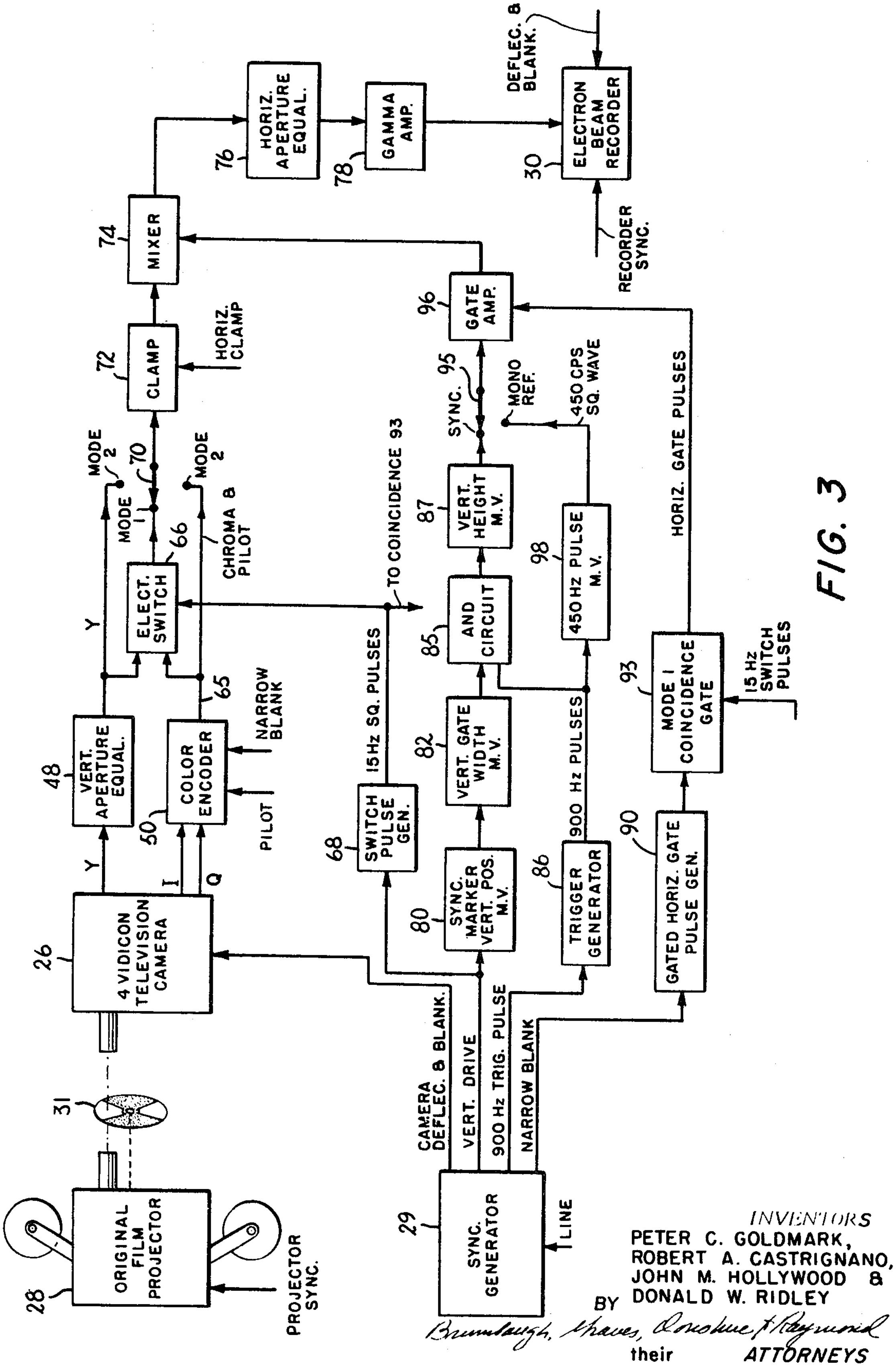
FIG. 3 is a block diagram schematic of a system for recording the film shown in FIG. 1.

FIG. 1 illustrates the format of a film recorded with the system of FIG. 3 to be described. The record medium is comprised of a transparent photographic strip 10, which may be about 8 mm. wide. As shown, the strip 10 carries a first longitudinal succession of frames 12 separated from a second succession of frames 14 by an opaque intermediate strip 16. For the purpose of the present discussion, it is assumed that the frames 12 contain a monochrome record of the luminance or brightness information in an original scene, for example a scene from a single frame of an original motion picture film. The frames 14 may contain a monochrome representation of the scenes in an independent program or, in the alternative and as shown, a coded monochrome representation of the color content of the corresponding scenes in the frames 12 of the type described earlier. The margins of the film may be used for a sound record, preferably in the form of magnetic tracks 18 recorded with the sound information. It is understood, however, that the sound record might also be of the optical type, such as the kind produced in accordance with the disclosure of U.S. Pat. NO. 3,335,219 for "Television Picture and Sound Recording Apparatus," issued Aug. 8, 1967.

Located in the intermediate strip 16 are a series of synchronizing marks or indicia 20 having a precisely fixed longitudinal position in respect of the frames 12 or 14. In FIG. 1, each synchronizing mark is longitudinally aligned with the top edge of the frames. This location is preferred because it corresponds to the position of the scanning beam at the beginning of each vertical scanning sequence during reproduction, although other locations of the marks 20 may also be satisfactory. It is also preferable to locate the marks 20 so that they intersect the centerline of the film, as shown, in order that they can be sensed by a detector, such as a light pipe centered in the film path and directing light through the film to a suitable photosensor. It will be noted that the photographic strip 10 can be extremely thin, having the approximate thickness of a magnetic tape, and the sprocket holes eliminated, as shown, for conveyance by a conventional capstan drive during reproduction.

In the left margin of the film strip 10 adjacent the outside edge of the frames 14 is a small longitudinal strip 21 containing a monochrome record of several cycles of the reference carrier recorded in the frames 14. As previously noted, the reference carrier has a frequency which is a multiple of the line recording rate so that maximum and minimum capacities of the film strip 10 corresponding to maximum and minimum amplitudes of the carrier during recording are in longitudinal alignment on the strip, thereby forming a series of parallel lines 21*a*.

Figures 2, 2A:
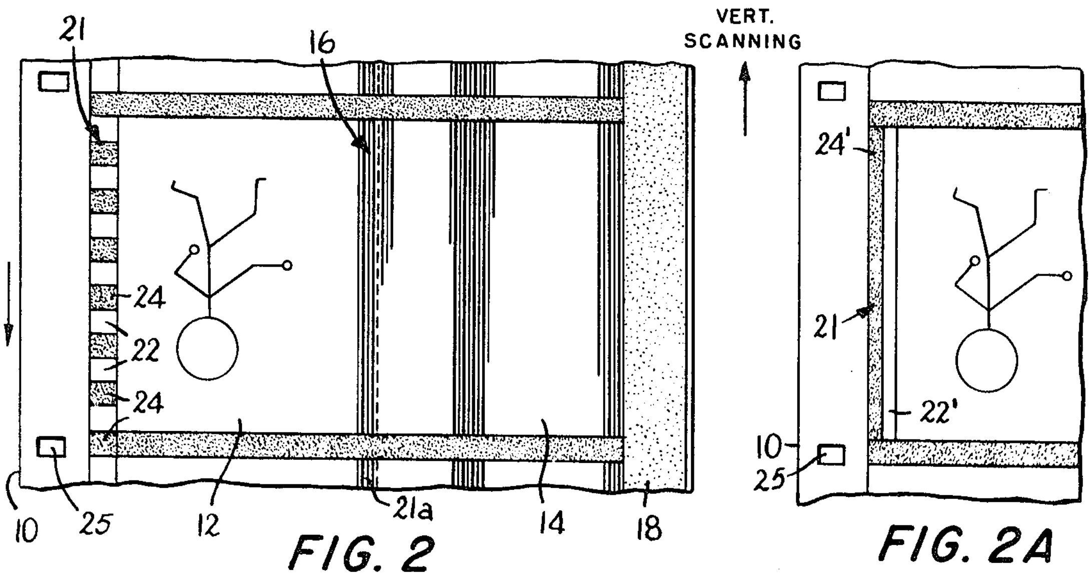
FIGS. 2 and 2A are plan views of a film record medium recorded with reference information in accordance with the invention.

FIG. 2 shows the format of the film preferred for television broadcasting of a color program. In general, the format of the film is identical to that shown and described in FIG. 1 in that it contains the succession of frames 12, 14, the intermediate strip 16 and the margin portion 21 for recording the reference carrier information. In place of the synchronizing indicia 20 in the strip 16, however, are the recorded cycles of the reference carriers, and alternating opaque portions 22 and transparent portions 24 fill the margin strip 21 to provide, when scanned a monochrome contrast signal. Since the portions 22, 24 are recorded simultaneously with the frames 12, 14, their relative opacities correspond to the maximum contrast in the frames. The resultant contrast signal, therefore, provides a continuous reference for both color saturation and luminance contrast. As indicated in FIG. 2, the images in the frames 12 are inverted relative to film motion and vertical scanning is carried out from image head to foot.

FIG. 2A shows a portion of the FIG. 2 film in which the portions 22′, 24′ take a different form than those in the FIG. 2 embodiment. There, the relatively opaque and transparent portions of the marginal strip 21 extend longitudinally of the film strip. One of the magnetic tracks 18 in FIG. 1 may be replaced by a suitable arrangement of sprocket holes 25 as shown in FIG. 2 and 2A, so that the film can be advanced by conventional sprocket drives of studio-type motion film picture projectors and, of course, the relative positions of the chrominance and monochrome frames (with associated reference indicia) may be interchanged.

It is apparent that the monochrome color film shown in FIGS. 2 and 2A has an important advantage over conventional cinematographic color film because the video signals representing the color information in the scene can be altered as needed to conform to a uniform standard. Thus, color component signals from a television camera chain viewing the original film may be electronically modified prior to modulation on the color carrier to maintain consistent color irrespective of hue and saturation deficiencies in the original. Since the color information ultimately recorded is in monochrome, the color information is not subject to deterioration by fading or chemical instability of color photographic film, and the television studio can be assured of quality and uniform color video signals.

FIG. 3 illustrates schematically a recording system in accordance with the invention for producing motion picture records of the type shown in FIGS. 1–2A. In this connection, it will be assumed that the source of video signals to be recorded is a four vidicon television camera chain 26 receiving optical images of original film scenes provided by a conventional projector 28. The television camera 26, supplied with deflection and blanking signals from the synchronization generator 29, produces a color video signal in the form of a luminance signal Y and either color difference signals (e.g., B-Y, R-Y) or NTSC I and Q signals. The latter are encoded and recorded along with luminance signal on a master record medium contained in a suitable recording device, such as an electron beam recorder 30. Associated with the projector 28 is a revolving shutter 31 which, as will be shortly explained in more detail, interrupts the projected scene viewed by the television camera 26 during such times when the original film is being intermittently advanced through the projector to prevent blurring of the image presented to the television camera.

To the end of obtaining the proper frame sequence between the original film and the film to be recorded, the projector 28 is equipped with a conventional 3/2 pulldown. In this manner, the original film remains stationary while two frames are recorded on the film under recording, whereafter the original film is advanced one frame while three frames are recorded. Thus, five recorded frames represent two frames of the original film, the original frame rate of 24 frames per second being converted into a new format for reproduction at the standard television rate, e.g., 60 frames per second. When European television standards are used, each original frame may be recorded twice so that playback may occur at a rate of 50 frames/sec., which is sufficiently close to the true rate of 48 frames/sec. to escape notice by the viewer.

Figure 4:
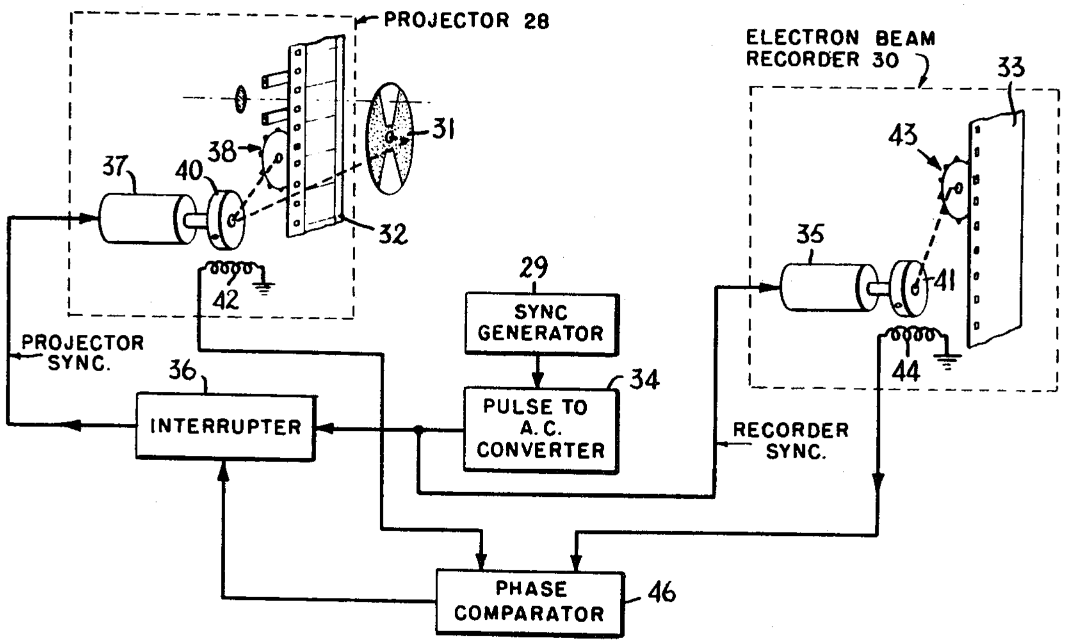
FIG. 4 is a schematic block diagram of a system for synchronizing advancement of an original film with advancement of the film to be recorded in the system of FIG. 3.
Figure 5:
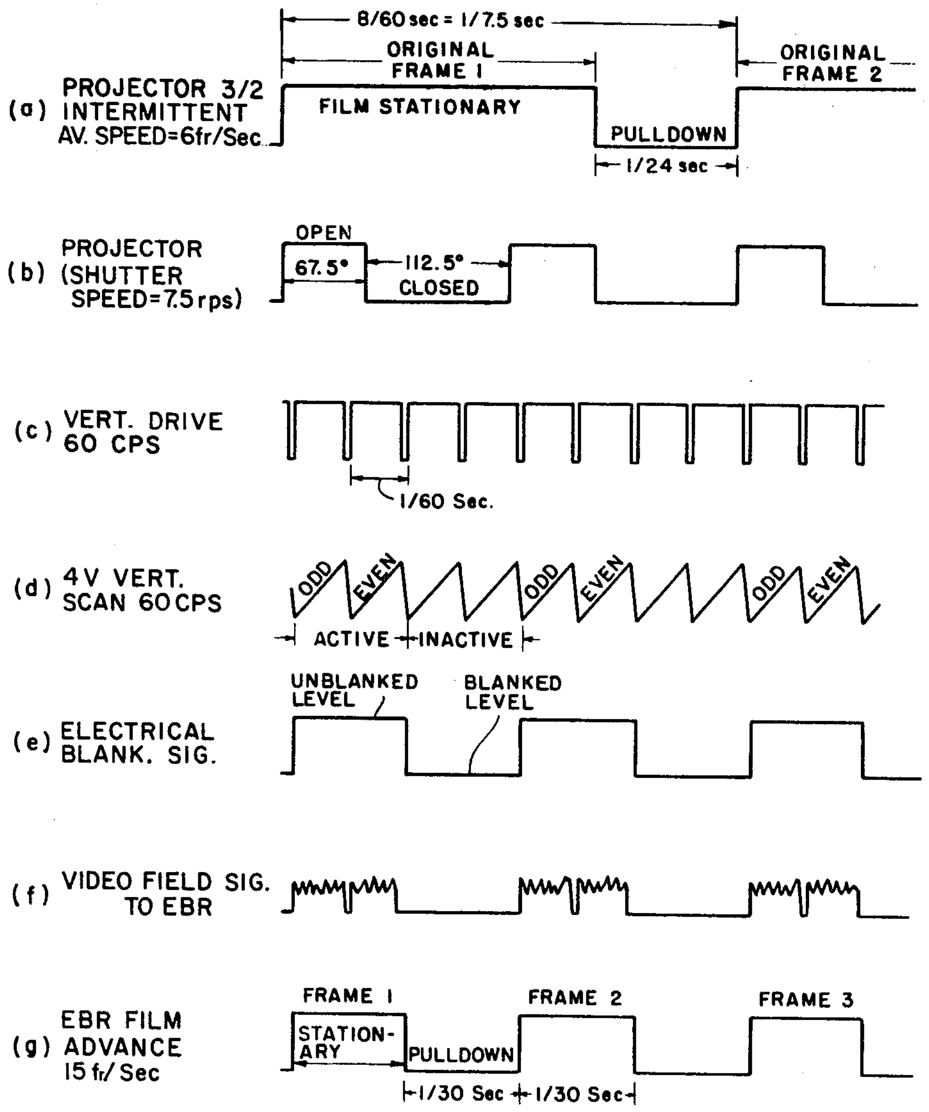
FIG. 5 is a series of graphs indicating the film pull down and video signal sequence in the FIG. 3 system.

FIG. 4 shows a system suitable for use with the invention for synchronizing the advancement of the original film 32 and the film 33 undergoing recording in the electron beam recorder 30, and its operation will be best understood with reference to the graphs of FIG. 5. Vertical drive pulses (FIG. 5*c*) from the synchronization generator 29 are supplied to a converter 34 whose output is an alternating current signal synchronized with vertical drive pulses. This alternating current signal is supplied to a synchronous motor 35 in the recorder 30 and, through an interrupting mechanism 36, to a similar synchronous motor 37 in the projector. The two motors 35 and 37 are thereby driven at a synchronous speed determined by the pulse rate from the synchronization generator.

The original film 32 is intermittently advanced by a conventional Geneva sprocket drive 38 mechanically coupled to the motor 37. Also associated with the motor 37 is a revolving disc 40 having a small magnetic element at a predetermined known circumferential location in the disc periphery. A similar disc 41 is connected to the synchronous drive motor 35 in the electron beam recorder. The discs 40, 41 cooperate with pickup coils 42, 44, respectively, which develop pulses each time the small magnetic elements in the discs pass the coil locations. The pulses from the coils 42 and 44 are directed to a phase comparator 46 which provides a control signal to the interrupter 36 whenever there is a time discrepancy between pulse occurrences and therefore between the "positions" of the pulldown mechanisms in the projector and electron beam recorder. The presence of the control signal causes the unit 36 to interrupt the alternating current signal to one of the drive motors 37, retarding advancement of the film 32 until the pulses generated at the coils 42, 44 occur simultaneously. Thereafter, the interrupter 36 allows the alternating current signal to pass directly to the motor 37.

The synchronous motor 35 is mechanically coupled to the sprocket drive assembly 43 of the electron beam recorder so as to intermittently advance the film 33 at a rate corresponding to the television field rate. For purposes of this discussion, it may be assumed that frames are recorded on the film 33 at a frame rate of 15 per second, with the film being held stationary for one-thirtieth second and advanced during the following one-thirtieth second interval. At a television scanning rate of 60 fields/sec., each film frame will contain two fields (one frame) of video information.

Graph *a* in FIG. 5 shows the pulldown sequence for the projector. When a first frame reaches its stationary position in the projector, the opaque blades of the shutter 31 (coupled to the motor 37) are located to pass the projected image to the television camera 26 just prior to initiation of the vertical field sequence. Graph *b* in FIG. 5 depicts the operation of the shutter, and for convenience the vertical drive pulses associated with the television camera are shown in graph *c*. Thus, the projected optical image is applied to the vidicons just prior to "readout" of the electrostatic image by the scanning beam in the vidicon. This small additional amount of time permits the vidicon mosaic to reach its full charge prior to readout.

Electrical blanking is supplied to the electron beam recorder 30 at a 15 cps. rate, as shown in graph *e*, so that a full set of odd and even scanning fields (graphs *d* and *f*) are developed by the television camera 26 during the first one-thirtieth second interval. Throughout this time the film 33 in the electron beam recorder 30 is stationary, as depicted in graph *g*. During the following one-thirtieth second interval, the recording beam is rendered inactive by blanking (graph *e*) and the film 33 advanced for exposure of the next frame. Prior to termination of the blanking signal, however, the shutter 31 once more opens to project the same scene to the vidicons in the television camera. Again, the shutter opens prior to occurrence of the vertical drive signal associated with the active odd field to compensate for transient charging effects in the vidicon, and two fields of video information are derived from the television camera and recorded on the film 33 in the advanced frame position.

At this time, two frames of the same scene have been recorded on the film in the electron beam recorder. In the meantime, however, the original film begins its advancement to a successive original frame upon closing of the shutter 31. Since the vidicon mosaics in the camera retain the image charge until read out by the scanning beam, advancement of the original film can be initiated as soon as the shutter is closed, reserving a one twenty-fourth sec. interval for pulldown in the projector, as shown in FIG. 5(*a*). Thereafter, the same sequence of events occurs, except that the original film is held stationary while three, rather than two, frames of the original scene are recorded in the electron beam recorder 30.

The foregoing sequence is applicable when recording a single track of picture information such as a single monochrome program. When a color program is to be recorded, luminance information is recorded as a full complement of a television field. Thereafter, however, the recording beam is shifted laterally of the film 33 to record one field only of encoded color signals in an adjacent frame. This type of recording can be easily accommodated by reducing the pulldown time for the electron beam recorder to one-sixtieth second and by shortening slightly the pulldown interval allotted the projector. In conjunction with this modification, the "closed" interval of the shutter may be reduced considerably to double the frequency of the "open" period. In this event, three successive Video Fields are utilized in recording the adjacent luminance and color frames and camera blanking is applied only every fourth video field during which pulldown occurs.

Returning to FIG. 3, the luminance signal from the television camera is supplied to a vertical aperture equalizer 48 and the color difference or NTSC color component signals are fed to a color encoder 50 whose output is in the form of a composite signal containing pilot carrier signal and a color carrier signal, modulated in amplitude and phase in accordance with the color saturation and hue of the color in the original scene, both carriers being multiple of the line recording rate.

Figure 6:
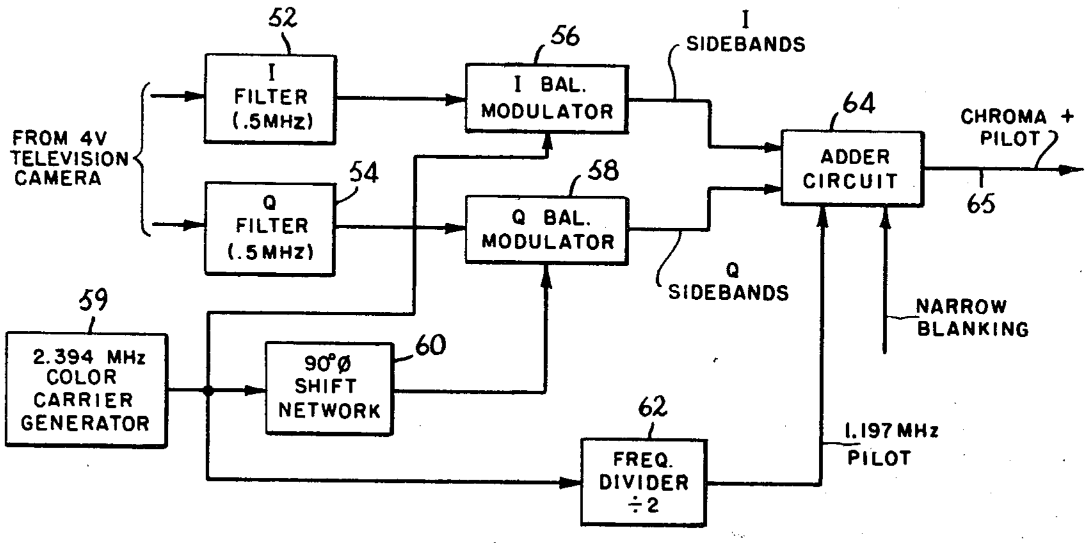
FIG. 6 is a more detailed schematic block diagram of the color encoder comprising a component of the FIG. 3 system.

The color encoder 50 is described in detail in the U.S. application Ser. NO. 519,106 and is also shown in FIG. 6. As shown, the inphase component I and the quadrature component Q of an NTSC signal are fed to 0.5 MHz low pass filters 52 and 54 to restrict the frequency bandwidth. The filter outputs are, in turn, used to modulate a color carrier signal in the balanced modulators 56 and 58, respectively. The color carrier is shifted 90° in the unit 60 prior to application to the modulator 58 to yield the proper quadrature phase relationship. In FIG. 6 the pilot frequency is derived from a frequency divider 62 receiving the color carrier signal as an input modulated carrier. The outputs of the modulators 56 and 58 contain only the sidebands of the color components I and Q, and are supplied together with the pilot carrier to adder circuit 64. Narrow, rather than normal, horizontal blanking is added to the composite color signal in the circuit 64 so that video blanking terminates prior to the beginning of each new line. In this manner, the sideband output of the circuit 64 is preceded at the beginning of each line with several cycles of the pilot signal only. Thus, when that portion of the signal is applied to the electron beam camera, it is recorded in the film margin 21, as shown in FIGS. 1 and 2.

Returning once again to FIG. 3, the luminance signal Y and the chrominance signal from the encoder 50 are supplied to an electronic switch 66 operable at the 15 Hz. frame recording rate under control of squarewave pulses supplied by a switch pulse generator 68. The pulse generator 68, in turn, is activated by the vertical drive pulses from the synchronization generator 29. The switch 66 therefore selects the luminance and encoded color signals for alternate one-thirtieth second intervals. recording in the color program mode (MODE 1), recorder blanking is initiated following the first field of color information, the remaining one-sixtieth second interval being available for pulldown of the film through the recorder, as previously explained. When recording a monochrome program, a switch 70 is thrown to the upper "MODE 2" to receive only the luminance signal, since no color signals are present. On the other hand, when it is desired to first record a sequence of frames containing luminance information only and to subsequently record an adjacent sequence of frames containing only color information, the switch 70 may be positioned to select the Y-signal during the recording of the first succession of frames, and then repositioned to the lower "-MODE 2" position for recording of the color frames. It is, of course, apparent that many more combinations and alternatives are available.

The signal selected by the switch 70 is applied to a conventional clamp network 72, receiving a horizontal clamping signal from either the television camera chain or the synchronization generator, to restore the signal black level. From the clamp, the video signals pass to a mixer 74 which adds the reference or synchronization signals to be recorded, as will be explained shortly, and then to a horizontal aperture equalizer 76. From the unit 76, the video signals pass through a conventional gamma amplifier 78 and then to the beam-modulating electrode of the recorder 30.

The horizontal aperture equalizer 76 may be of the type disclosed in the U.S. Pat. No. 3,011,018 to Sullivan, preferably having a transfer characteristic selected to give frequency preemphasis suitable from compensating for losses in definition arising during processing and playback of the film to be recorded. In this regard, the transfer characteristic is preferably related to the horizontal resolution characteristic of the film ultimately to be reproduced from the master film recorded with the FIG. 3 system.

It should also be noted that horizontal aperture correction may be applied to the chrominance signal at the output of the encoder to boost signal amplitudes of the high frequency end of the chrominance carrier bandwidth, if desired, and may have a different frequency characteristic than the unit 76. In addition, the unit 76 may have a characteristic to pass unaltered those signal frequencies within the chrominance bandwidth or may be located in the Y channel only, as when a separate aperture equalizer is used in the chrominance channel.

A suitable type of vertical aperture equalizer 48 is described in an article entitled "A Vertical Aperture Equalizer for Television" appearing at pages 395–401 of the Journal of the SMPTE, Volume 69, No. 6, June 1960. In this case, as well, the device is preferably designed to have a vertical equalizing characteristic sufficient to compensate for substantially all vertical resolution losses which may be expected to occur during processing of the film being recorded and in playback of reproductions made from such film. In both cases, it is understood that compensation for less than all of such expected losses may be made, if desired. In this connection it will be noted that the luminance signal is aperture corrected both vertically nd horizontally whereas the encoded signals are corrected only horizontally.

The dimension of the horizontal scan defined by the recording beam 30 is chosen to include the marginal strip 21 of the film when recording the left-hand frame (FIG. 2), and to include the intermediate portion 16 when recording the right-hand frame. As explained earlier, narrow, rather than normal, blanking is applied to the adder circuit 64 in the encoder 50, so that blanking terminates when the recording beam begins each new line. Normal blanking, however, is applied to the television camera chain 26 so that no NTSC color component signals are developed until the recording beam reaches the left-hand edge of the chrominance frames. Thus, the recorder beam is modulated only with the pilot carrier signal during its traverse of marginal strip 21 of the film (FIG. 1) or of the intermediate strip 16 (FIG. 2).

Figure 7:
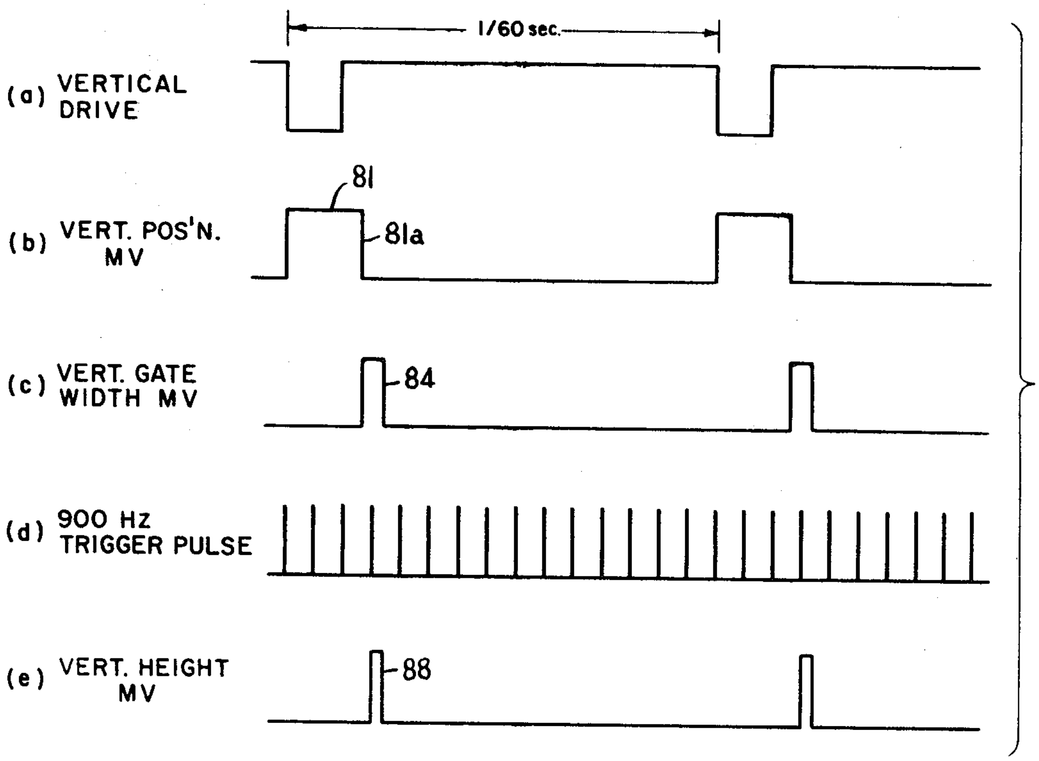
FIGS. 7 and 8 are a series of graphs of various signals developed in the FIG. 3 system and useful in explaining its operation.

The synchronizing marks 20 and reference marks 22, 24 are formed as follows. Vertical drive pulses (FIG. 7*a*) are fed to a "vertical position" multivibrator 80 which, in response to each vertical drive pulse, produces a squarewave pulse 81 (FIG. 7*b*) having a trailing edge 81*a* corresponding to the time in the vertical field sequence at which the system is conditioned to record a transparent portion of the strip adjacent the monochrome frame. The pulses 81 are fed to a "vertical gate width" multivibrator 82 which, in response to termination of each pulse 81, generates a pulse 84 (FIG. 7*c*)

An AND circuit 85 receives the pulses 84 together with sharp trigger pulses (FIG. 7*d*) from a trigger generator 86 having a repetition rate which is a multiple of the vertical scanning frequency. In the United States, where a 60 Hz. field rate is used, the trigger pulses may appear at a rate of about 900 Hz. The width of the pulses 84 is less than the time spacing between the trigger pulses so that only one trigger pulse will occur during any pulse 84. Upon time coincidence of a 900 Hz. trigger pulse and a pulse 84 from the multivibrator 82, the AND circuit passes the trigger pulse to a "vertical height" multivibrator 87 whose output is a pulse 88 (FIG. 7*e*) having a duration corresponding to the number of horizontal scanning lines to be used in recording the transparent portion. Where the transparent portion comprises a narrow window-type synchronizing mark 20, the duration of this pulse will be rather short so as to encompass only a few horizontal lines. Preferably, the duration of the pulses 81 from the multivibrator 80 and of the pulses 88 from the multivibrator 87 are adjustable so as to obtain any desired location and dimension of the transparent portions.

As earlier noted, the pulses 84 from the multivibrator 82 preferably have a width which is slightly less than the time spacing between adjacent trigger pulses so that a single trigger pulse is selected for each pulse 84. Since the trigger pulses occur at a frequency which is a multiple of the vertical field frequency, the occurrence of each trigger pulse is precisely timed in respect of the vertical drive frequency and will consistently occur when the recording beam is at a precise vertical position relative to the frame being recorded.

Figure 8:
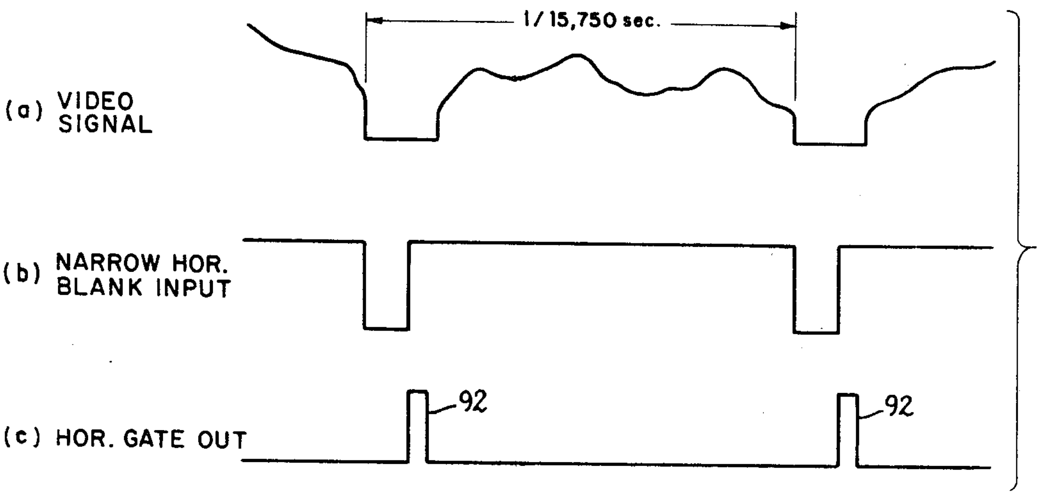

The horizontal, or transverse, location and dimension of the transparent portions to be recorded are determined as follows. Narrow blanking pulses (FIG. 8*b*) from the synchronization generator 29 energize a horizontal gate pulse generator 90 whose output is a narrow pulse 92 (FIG. 8*c*) initiated upon termination of the narrow blanking signal. The video signal with normal blanking is shown in FIG. 8*a* for purpose of comparison. Pulses 92 thereafter pass through a coincidence gate 93 to a gated amplifier 96, producing a squarewave pulse output only upon time coincidence of a horizontal gate pulse 92 and a vertical gate pulse selected by a switch 95. The occurrence and width of the selected vertical gate pulse determine the vertical location and dimension of the indicia recorded in the strip adjacent the frame, while the occurrence and width of the horizontal gate pulse 92 fixes the transverse location and dimension. When recording synchronizing indicia, the switch 95 is positioned to "SYNC" so that a single pulse 88 (FIG. 7*e*) is passed to the gate amplifier 96 during each video field, and pulses 92 will appear at the output of the amplifier 96 only when coincident with a pulse 88. The pulse output of the unit 96 is added to the composite video signal in the mixer 74 for application to the modulating input of the electron beam recorder.

If a color program is being recorded in the format of FIG. 2, during which the recording beam is switched at a 30 Hz. rate between the left and right adjacent frame positions, the mode coincidence gate 93 is effective to restrict passage of the horizontal gate pulse to the unit 96 except when the recording beam is in the left frame position. It is in that position that indicia in the margin strip 21 are recorded and, to this end, the gate 93 is controlled by 15 Hz. switch pulses from the pulse generator 68. When recording a single track in monochrome, the 15 Hz. switch pulses will be synchronized with the stationary film period (FIG. 5*g*) so that the horizontal gate pulses are blocked by the gate 93 during film pulldown.

For timing the series of alternating transparent and opaque portions 22, 24 shown in FIG. 2, the switch 95 is moved to the alternate "MONO REF." position. In this instance, the pulse output from the multivibrator 87 is replaced by a 450 Hz. squarewave signal from the multivibrator 98, which is slaved to the 900 Hz. trigger pulses from the trigger generator 86. Thus, approximately nine pulses at 450 Hz. are supplied to the gated amplifier 96 during each vertical television field. As before, the coincidence gate 93 supplies the horizontal gate pulses to the amplifier 96 to fix the width and location of the transparent portions 22 to be recorded.

Preferably the pulse units 80, 87, 90 and 98 are conventional multivibrators from which the pulse output width is variable to ensure proper location of the recorded indicia by a few initial adjustments.

The format of the film shown in FIG. 2A is easily realized by shortening the horizontal gate pulse so that it occupies approximately one-half of the time during which the recording beam traverses the strip 21, and by extending vertical gating for the duration of at least one video field (e.g., one-sixtieth sec.).

From the foregoing, it is readily apparent that the FIG. 3 system is effective to record synchronizing or reference indicia in consistently precise relationship to the position and dimension of the frames. In this connection, it will be understood that the record medium processed in the recorder 30 may serve as a master film from which reproductions may be made by conventional contact printing methods known in the art. In such case both the master and the reproductions made therefrom may contain sprocket holes to facilitate advancement through the recorder, and magnetic sound tracks 18 as indicated in FIG. 2. Moreover, other pattern variations may be recorded in the film outside the frame areas.

Thus, although the invention has been described with reference to specific embodiments, many variations and modifications may be made without departing from the spirit and scope of the invention. As a further example, the frame rate at which the record medium is recorded can be varied to meet particular requirements and, as previously explained, various modes of shutter operation can be implemented in accordance with the invention. Furthermore, it is also apparent that other sources of video information, such as taped or live video programs, can be recorded in this manner by the implementation with the present system of one or more of the embodiments disclosed in the U.S. application Ser. NO. 691,093 filed Nov. 24, 1967 of Renville McMann, Jr., for "Film Recording Method and Apparatus" now U.S. Pat. No. 3,571,503. Accordingly, all such modifications and variations are intended to be included within the scope of the appended claims.

1. A monochrome record medium carrying picture information for reproduction using television scanning techniques, comprising: a thin band of material having disposed thereon at least two longitudinal successions of frames aligned in laterally displaced relation, each frame containing a monochrome representation of video information, and at least one longitudinal strip arranged adjacent to one of said successions of frames, said strip having recorded thereon synchronizing marks, longitudinally spaced the distance of successive frames, for producing a vertical synchronizing signal upon reproduction of said record medium, said synchronizing marks being in the form of a single area associated with each laterally arranged set of frames, being small compared to the frame area, having an optical transmissivity opposite to that of the remaining portion of said strip and being positioned in the same predetermined longitudinal relation to a transverse edge of each frame of said one succession of frames.

2. A record medium as set forth in claim 1, in which:

one of said at least one strips is arranged intermediate between two of said at least two successions of frames.

3. A record medium as set forth in claim 1, in which:

said material has recorded in different frames thereon monochrome representations of the luminance information and encoded color information, respectively, in a color picture, whereby a plurality of color pictures are recorded, for successive reproduction, on a plurality of frames containing luminance information and a plurality of separate frames containing color information.

4. A record medium as defined in claim 1, in which:

at least one of the frames contain information of the color of the original picture in the form of a series of parallel zones extending transversely of the frame, each zone comprising a series of transversely spaced elements at a given spatial periodicity forming a first record of a carrier modulated with color information in a corresponding zone of the original picture, and a second series of transversely spaced elements forming a second record of a reference carrier and having a different spatial periodicity that is a multiple or submultiple of the spatial periodicity of the first record; and in which said band of material additionally contains a second longitudinal strip arranged adjacent to said at least one frame, said second longitudinal strip containing a series of alternating relatively opaque and transparent lines having a spatial periodicity equal to the spatial periodicity of the second record.

5. A record medium in accordance with claim 4, further comprising:

a strip of magnetic material extending longitudinally of the record medium between an edge thereof and the edges of the frames of one longitudinal succession.

6. Apparatus for recording a picture record medium in the form of at least two longitudinal successions of frames aligned in laterally displaced relation, each frame containing a monochrome representation of video information for reproduction using television scanning techniques, nd at least one longitudinal strip arranged adjacent to one of said successions of frames having recorded thereon synchronizing marks, longitudinally spaced the distance of successive frames and positioned in predetermined longitudinal relation to a transverse edge of each frame of said one succession of frames, said apparatus comprising:

a video source for producing a succession of video signals, each in a scanning rate sequence comprised of a vertical succession horizontal scan lines of video information corresponding to scanned original scenes;

generator means for producing first and second pulse sequences at frequencies related to the respective vertical and horizontal scanning rates of said source;

means jointly responsive to said first and second pulse sequences for producing a reference signal having a predetermined time relation to the time of initiation of each video signal sequence;

recording means having at least one beam operative to scan said record medium in a sequence corresponding to the video signal sequence; and means for applying said reference signal to said recording means to modulate said beam with said reference signal for a predetermined number of horizontal scan lines of each scan sequence of said recording means to thereby record said reference signal as one of said synchronizing marks on said at least one longitudinal strip of the record medium in a predetermined location relative to a transverse edge of a frame.

7. Apparatus as defined in claim 6 in which:

the means for applying said reference signal comprises mixer means jointly responsive to the video signal and said reference signal for combining the two signals.

8. Apparatus as defined in claim 6, further comprising:

means responsive to said second pulse sequence for controlling the duration of said reference signal during each horizontal scan to thereby control the transverse dimension of said synchronizing marks.

9. Apparatus as defined in claim 6 further comprising:

means responsive to said first pulse sequence for controlling the occurrence of said reference signal to thereby control the longitudinal position of said synchronizing marks.

10. Apparatus according to claim 6, in which the jointly responsive means includes:

first pulse generator means responsive to said first pulse sequence for producing a first pulse output in timed relation to the occurrence of each video signal sequence;

second pulse generator means responsive to said second pulse sequence for producing a second pulse output in timed relation to the occurrence of at least one scan line in the video signal sequence; and gating means jointly responsive to the first and second pulse generator means for producing said reference signal upon time coincidence of said first and second pulse outputs.

11. Apparatus according to claim 10, further comprising:

trigger pulse-generating means, synchronized with said generator means for producing first and second pulse sequences, for generating a pulse at a rate which is a multiple of the vertical scanning rate; and second gating means jointly responsive to the pulses from said trigger pulse generating means and to said first pulse sequence to provide a pulse input to said first pulse generator means upon time coincidence of one of said trigger pulses and one of the pulses of said first pulse sequence.

12. Apparatus as defined in claim 6, in which:

said first pulse sequence comprises at least one pulse occurring during each scanning sequence; and said jointly responsive means includes first pulse generator means producing a locating pulse terminating approximately at a time at which said reference signal is to occur in response to a signal at the vertical scanning rate; and second pulse generator means responsive to termination of the locating pulse for generating a vertical gate pulse having a width related to the longitudinal dimension of said synchronizing marks.

13. Apparatus according to claim 6, in which:

said first pulse sequence comprises a series of time displaced pulses occurring at a rate which is greater than the vertical scanning rate.

14. Apparatus according to claim 6, in which the jointly responsive means includes:

means for generating a pulse output at a frequency proportional to the horizontal scanning rate; and pulse generator means responsive to said generated pulse output for producing a horizontal gate pulse at a predetermined time in each horizontal scan line and having a duration corresponding to the desired transverse dimension of said synchronizing marks, 15. Apparatus according to claim 14, in which the jointly responsive means includes:

pulse generator means producing a portioned vertical gate pulse in response to said first pulse sequence at the vertical scanning rate; and
gating means primarily responsive to said vertical and horizontal gate pulses.

16. Apparatus according to claim 15, further comprising:
means for generating a signal at a rate which is a submultiple of the vertical scanning rate; and
time coincidence means jointly responsive to the multiple rate signal and one of the vertical and horizontal gate pulses for restricting the production of said reference signal during certain of the video signal sequences determined by the multiple rate signal.

17. Apparatus according to claim 6, in which:
the original scenes are produced by means for projecting scenes on a motion picture film in succession; and
the video source includes a television camera viewing such projected scenes.

18. Apparatus according to claim 6, in which the video source produces video signals representing color information and luminance information contained in the original scene, the apparatus further comprising:
first aperture correction means receiving the luminance video signal and having a frequency characteristic representing a resolution property of the record medium along one direction on the frame to produce emphasis of such signal to predetermined degrees in accordance with the frequency components thereof;
switch means responsive to a second signal having a frequency related to the vertical scanning rate for selecting the color and emphasized luminance video signals in a predetermined order; and
second aperture correction means receiving the selected color and emphasized luminance video signals and having a frequency characteristic representing a resolution property of the record medium along a relatively orthogonal direction on the frame to produce emphasis of at least one of such signals to predetermined degrees according to the frequency components therein prior to its application to the recording beam means.

19. In a system for recording a record medium in a succession of frames corresponding to a succession of scenes contained on a motion picture film, the combination of:
a projector for projecting the scenes of the motion picture film;
a television camera system for viewing the projected scenes to develop a succession of video signals having a given sequence and representing the picture information contained therein, each video signal containing components of the color information an luminance information in the original scene;
beam recording means having at least one beam scanning the record medium in a field sequence corresponding to the video field signal sequence;
means receiving the luminance video signal and having a frequency characteristic representing a vertical resolution property of the record medium to produce emphasis of such signal to predetermined degrees in accordance with the frequency components thereof;
switch means responsive to a second signal having a frequency related to the video field signal rate for selecting the color and emphasized luminance video signal in a predetermined order; and
means receiving the selected color and emphasized luminance video signals and having a frequency characteristic representing a horizontal resolution property of the record medium to produce emphasis of at least one of such signals to predetermined degrees according to the frequency components therein prior to its application to the recording beam means.